US009406048B2

(12) United States Patent
Meister et al.

(10) Patent No.: US 9,406,048 B2
(45) Date of Patent: Aug. 2, 2016

(54) EMAIL SYSTEM FOR PREVENTING INADVERTANT TRANSMISSION OF PROPRIETY MESSAGE OR DOCUMENTS TO UNINTENDED RECIPIENT

(76) Inventors: Mark Meister, Potomac, MD (US); James Randall Beckers, Rockville, MD (US)

(*) Notice: Subject to any disclaimer, the term of this patent is extended or adjusted under 35 U.S.C. 154(b) by 69 days.

(21) Appl. No.: 12/831,456

(22) Filed: Jul. 7, 2010

(65) Prior Publication Data
US 2012/0011192 A1 Jan. 12, 2012

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
CPC ... H04L 12/585; H04L 51/12; H04L 12/2803; H04L 12/2818; H04L 2012/2843; H04L 2012/285; H04L 67/125; H04L 67/306; H04L 9/0891; H04L 9/32; H04L 51/02; H04L 12/583; H04L 29/12594; H04L 49/355
USPC ....................................... 709/206
See application file for complete search history.

(56) References Cited

U.S. PATENT DOCUMENTS

| 6,732,149 | B1* | 5/2004 | Kephart | 709/206 |
|---|---|---|---|---|
| 7,024,462 | B1* | 4/2006 | McErlean | 709/207 |
| 7,730,540 | B1* | 6/2010 | Woirhaye et al. | 726/26 |
| 7,865,958 | B2* | 1/2011 | Lieblich et al. | 726/25 |
| 7,873,183 | B2* | 1/2011 | He et al. | 382/100 |
| 7,877,446 | B2* | 1/2011 | Tamai et al. | 709/206 |
| 8,001,609 | B1* | 8/2011 | Chan et al. | 726/27 |
| 8,181,036 | B1* | 5/2012 | Nachenberg | 713/189 |
| 8,199,965 | B1* | 6/2012 | Basavapatna et al. | 382/100 |
| 9,306,887 | B1 | 4/2016 | Brunetti et al. | |
| 2002/0004908 | A1* | 1/2002 | Galea | 713/200 |
| 2003/0169151 | A1* | 9/2003 | Ebling et al. | 340/7.58 |
| 2004/0215726 | A1* | 10/2004 | Arning et al. | 709/206 |
| 2004/0225645 | A1* | 11/2004 | Rowney et al. | 707/3 |
| 2004/0243844 | A1* | 12/2004 | Adkins | 713/201 |
| 2005/0262557 | A1* | 11/2005 | Fellenstein et al. | 726/22 |
| 2006/0005017 | A1* | 1/2006 | Black et al. | 713/165 |
| 2006/0005247 | A1* | 1/2006 | Zhang et al. | 726/26 |
| 2006/0026091 | A1* | 2/2006 | Keen et al. | 705/37 |
| 2006/0075228 | A1* | 4/2006 | Black et al. | 713/167 |
| 2006/0236404 | A1* | 10/2006 | Burakoff et al. | 726/26 |
| 2007/0005708 | A1* | 1/2007 | Juliano | 709/206 |
| 2007/0094394 | A1* | 4/2007 | Singh et al. | 709/226 |
| 2007/0106741 | A1* | 5/2007 | Christoff et al. | 709/206 |
| 2007/0112821 | A1* | 5/2007 | Lunt et al. | 707/101 |
| 2007/0271608 | A1* | 11/2007 | Shimizu et al. | 726/17 |
| 2008/0091785 | A1* | 4/2008 | Pulfer et al. | 709/206 |
| 2008/0162652 | A1* | 7/2008 | True et al. | 709/206 |

(Continued)

OTHER PUBLICATIONS http://service.meltwaternews.com/mnews/redirect.html?docid=7366915&userId=2982733&cId=128894&pId=11&agentId=178656&type=3&etype=USER_CREATED&t=and+The+US+Patent+Goes+To+%E2%80%A6+Kevin+Spacey&cdt=1463403000000&sn=Law360&cc=United+States&surl=&an=Clicked+from+Archive%2C+Newsfeed%2C+or+Newsletter&ue=ryan.elliott@uspto.gov&url=.

*Primary Examiner* — Karen Tang

(57) ABSTRACT

A system that alerts a sender of an email message as to the addressees of the email when the email is determined to be sensitive, such as when it includes a word such a "confidential". The user can allow the message to be sent or go back to a mail create/edit operation where the message or list of addresses can be revised. Trigger words can be stored in a table or database. The system also detects sensitive words in attachments. The sensitive words detected and their locations can be shown in a pop-up message.

8 Claims, 4 Drawing Sheets

(56) References Cited

U.S. PATENT DOCUMENTS

| | | | |
|---|---|---|---|
| 2008/0168145 A1* | 7/2008 | Wilson | 709/206 |
| 2008/0244437 A1* | 10/2008 | Fischer | 715/772 |
| 2008/0301454 A1* | 12/2008 | Malcolm et al. | 713/176 |
| 2009/0070881 A1* | 3/2009 | Yellepeddy et al. | 726/26 |
| 2009/0119579 A1* | 5/2009 | Fellenstein et al. | 715/234 |
| 2009/0158441 A1* | 6/2009 | Mohler et al. | 726/27 |
| 2009/0177750 A1* | 7/2009 | Lee et al. | 709/206 |
| 2009/0214034 A1* | 8/2009 | Mehrotra et al. | 380/255 |
| 2009/0265441 A1* | 10/2009 | Hirota et al. | 709/206 |
| 2010/0057720 A1* | 3/2010 | Kalyan et al. | 707/5 |
| 2010/0085593 A1* | 4/2010 | Peled et al. | 358/1.14 |
| 2010/0125891 A1* | 5/2010 | Baskaran | 726/1 |
| 2010/0138754 A1* | 6/2010 | Wilson et al. | 715/752 |
| 2010/0175136 A1* | 7/2010 | Frumer et al. | 726/26 |
| 2010/0198931 A1* | 8/2010 | Pocklington et al. | 709/206 |
| 2010/0306850 A1* | 12/2010 | Barile et al. | 726/25 |
| 2011/0083159 A1* | 4/2011 | Brown et al. | 726/1 |
| 2011/0138467 A1* | 6/2011 | Macwan et al. | 726/24 |
| 2011/0313757 A1* | 12/2011 | Hoover et al. | 704/9 |
| 2012/0016884 A1* | 1/2012 | Rowney et al. | 707/747 |
| 2012/0023182 A1* | 1/2012 | Pulfer et al. | 709/206 |
| 2012/0159649 A1* | 6/2012 | Roger et al. | 726/28 |
| 2012/0232996 A1* | 9/2012 | Scott | 705/14.64 |

* cited by examiner

EMAIL SYSTEM FOR PREVENTING INADVERTANT TRANSMISSION OF PROPRIETY MESSAGE OR DOCUMENTS TO UNINTENDED RECIPIENT

BACKGROUND

1. Field

The present invention is directed to a system that can prevent confidential or proprietary email messages from being inadvertently sent.

2. Description of the Related Art

Proprietary or otherwise sensitive or confidential information is routinely exchanged during the ordinary course of business. While the errant or inadvertent transmission of proprietary information in the form a "hard-copy" is rare, such is not the case when proprietary information is included in electronic form (e.g., electronic mail, or "e-mail".) It is not at all uncommon that email is misaddressed in haste or simply as the result of an oversight. In that event, proprietary information can and does fall into the wrong hands, e.g., a business competitor or the adverse party in a legal proceeding, too frequently. What is needed is the addition of at least two steps in the process of creating and transmitting electronic messages in order to prevent inadvertent disclosure of sensitive information. The first additional step is one that scans the content of the email, including any attachments, for markings that indicate it includes proprietary information (e.g., "Proprietary" header and/or footer, etc.). The second additional step requests that the sender confirm that the email and attachments are intended for the specific addressee(s).

SUMMARY

It is an aspect of the embodiments to provide a system that alerts the user in order to prevent confidential or proprietary email messages from being sent to an unintended recipient inadvertently.

The above aspects can be attained by a system that alerts a user with a message pop-up when an email message is to be sent that may be sensitive, such as when it includes a word such a "confidential". The user can allow the message to be sent or go back to a mail create/edit operation where the message and/or addressees can be revised. Trigger words can be stored in a table or database. The system also detects sensitive words in attachments. The sensitive words detected and their locations can be shown in the pop-up message.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Proprietary information is commonly exchanged among business partners or potential partners. When it is, confidentiality is or may be critical to a successful venture, and therefore the unintended disclosure of proprietary information can have disastrous effects.

Figure 1:
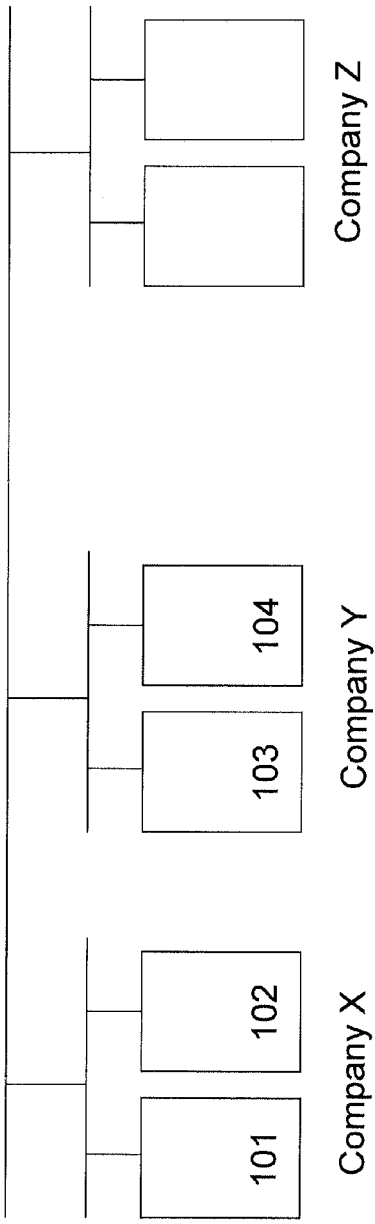
FIG. 1 illustrates a computer network that can be used to transmit proprietary or otherwise confidential information in electronic form.
Figure 2:
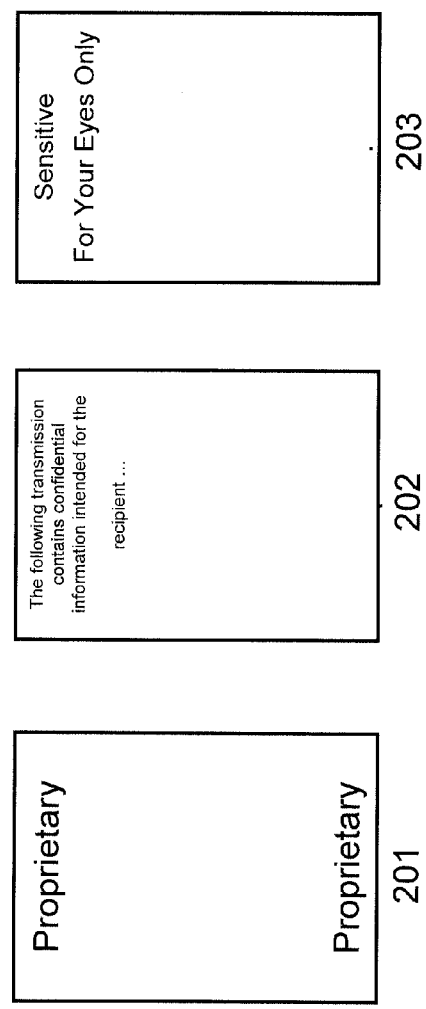
FIG. 2 illustrates some markings that might typically be used to alert a recipient or a reader that the information included in a transmission is proprietary or confidential.

In the modern times, most if not all business data is exchanged electronically, for example by electronic mail ("email") via the public Internet ("Internet"). FIG. 1 illustrates how businesses are connected via the Internet, and specifically illustrates a sender's computer 101 and a recipient's computer 103, and their respective email servers 102 and 104. Typically, the sender uses widely available word processing, spreadsheet, presentation-builder, and/or client email applications resident on his/her computer to create and store documents. When proprietary or sensitive information is included in these documents, it is common that the author and/or sender will add a caption to alert any recipient as to the confidential nature of the information. Representative markings are shown by reference numbers 201, 202, and 203 in FIG. 2.

Figure 3:
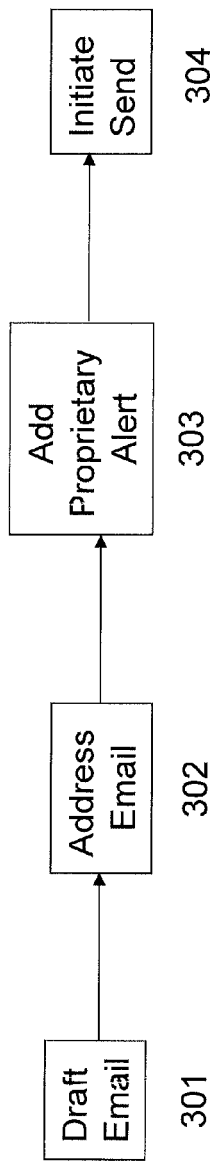
FIG. 3 diagrams the high level steps that typically occur in drafting an email up to the point that network transmission is initiated. For the example, the use of the public Internet is assumed as the transmission medium.

When a sender wishes to share proprietary information that's been prepared as described above, they will ordinarily transmit it via the Internet. As is commonly done today, an email is drafted (see FIG. 3) 301 and addressed 302 using the client application on the sender's computer 101. Attachments and "Proprietary" markings, e.g., 201, are added 303 as applicable. When the user is ready to send the email, she "presses" the "send" button 304 on her email tool. From there, the sender's computer 101 makes a network connection to an email server 102, and the email makes its way from sender, to receiver's email server 104 and computer 103. Assuming that the sender intended for that receiver to have the information in or attached to the email, the desired result has been achieved.

Figure 4:
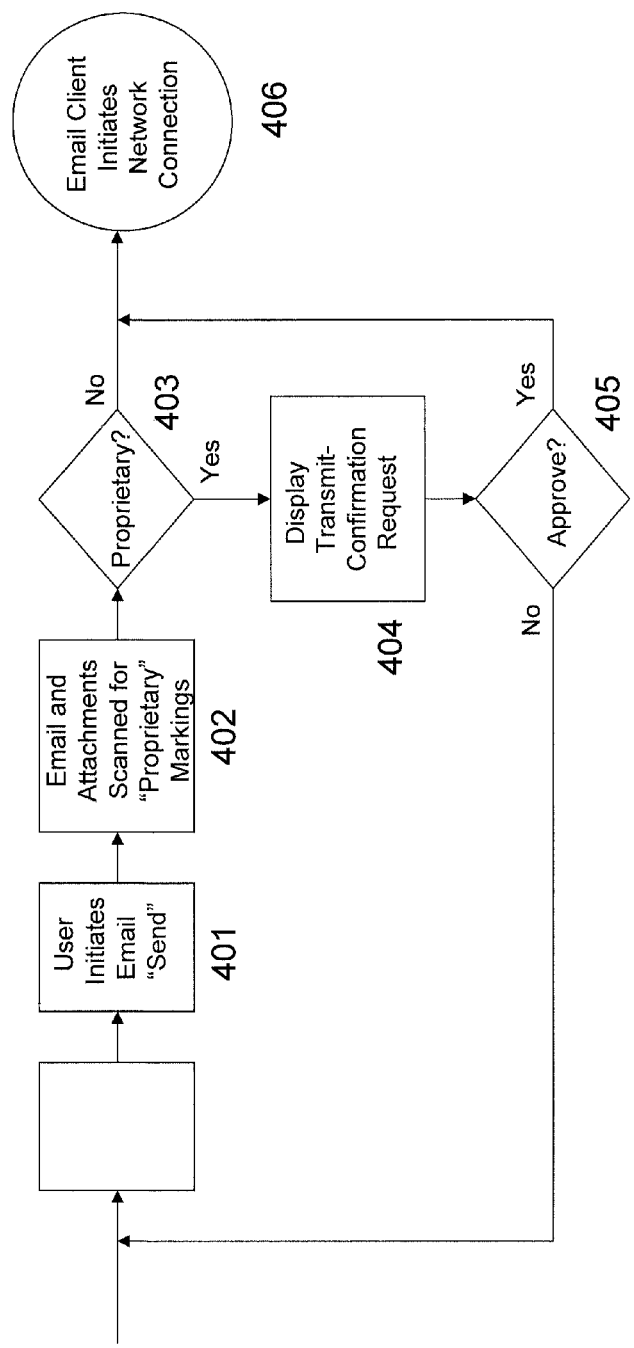
FIG. 4 extends the process diagramed in FIG. 3 in order to affect the check and alert/confirm aspects of the subject invention.

It can and does happen that email is errantly addressed and therefore ends up in the possession of an unintended recipient. To catch the unintended error and prevent this undesirable result, operations 402-405 of FIG. 4 can, by way of example, be inserted in the process. After the sender "presses" the "send" button 401 and before the client email application may make a network connection 406 to its email server 102, the system detects the send button activation and scans the email and attachments (as applicable) for words indicative of sensitive information 402. The message is examined, for example, for the words "proprietary", or "confidential", or "sensitive", etc. This can be accomplished in the same way that "spell checking" is implemented (or included as part of that same step, if enabled, for that matter.) Note that a custom dictionary of "trigger" words could optionally also be compiled by the individual user or user's agency, and used during the screening 402. The scanning process includes scanning the email message and attachments, including the email subject line, headers, footers, notes, body text, file name, etc. and any other parts of the message that can be labeled with or include a trigger word, such as meta data.

Figure 5:
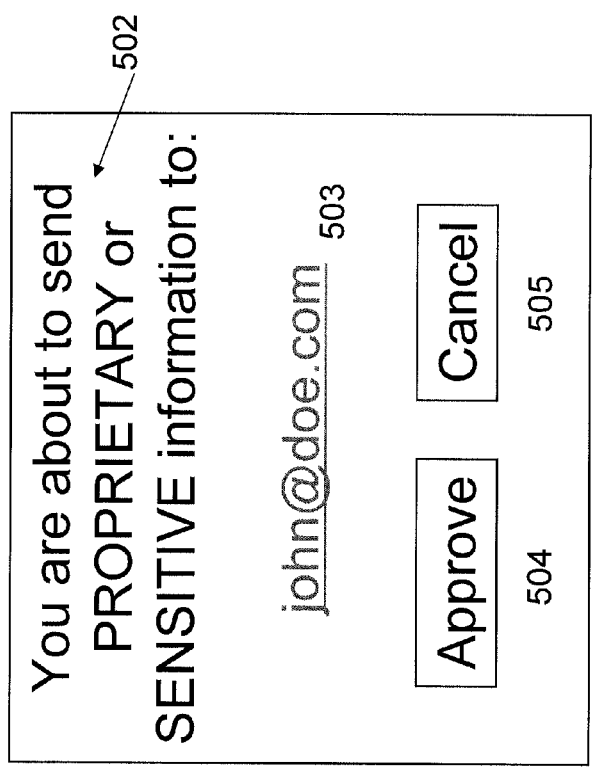
FIG. 5 illustrates the "Confirmation Request" that a sender of proprietary information might see in order to prevent inadvertent transmission.

In the event that one of any of the recognizable words is found 403, in either the email or the attachments, the application displays a "Confirmation Request" 404 in the form of a "pop-up" 501 (see FIG. 5) on the display of the sender's computer 101. The pop-up warns the sender that she is about to send proprietary information 502, displays the addressee's email address 503, and requests that the sender either "approve" 504 the transmission, in which case the application makes the connection 406 to the email server 102 to continue the conventional transmission sequence, or the user can "cancel" 505 the transmission and return the sender to any of the email drafting steps coming before the send button is activated 401. This will allow the user to revise the message.

Figure 6:
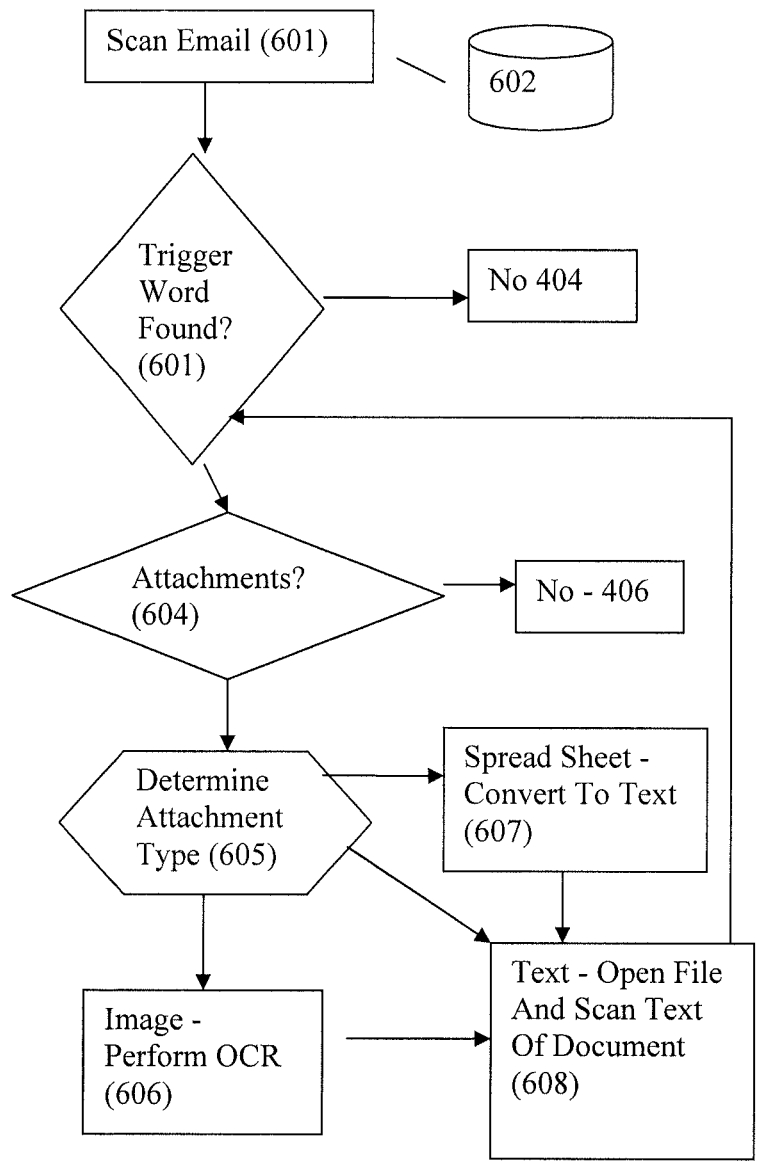
FIG. 6 depicts scanning in more detail.

As depicted in FIG. 6, the system can scan 601 the email message, including subject line, etc. for trigger words that can be stored in a trigger word database 602. If a trigger word is found, 603, the confirmation request pop-up is displayed 404. If no trigger words are found in the email message, the system can check 604 to see if the message has attachments. If there are attachments, the type of the first attachments can be determined 605. When the attachments type is an image type, the attachment is opened and an optical charter recognition process can be executed 606 to produce a text file of words in the image file. When the file type of the attachment is a spread sheet, the cells of the spread sheet can be converted 607 into a text file. When the file type is text, the file can be opened and the text can scanned for the trigger word of the database 602. Then, a determination 603 can be made as to whether trigger words have been found. Again, if trigger words are found, the pop-up can be displayed 404. When no trigger words are found, the system can check 604 to see if additional attachments are attached to the email message.

The embodiments have been described with the pop-up confirmation being displayed when a trigger word is discovered, this can occur when a trigger word is first encountered and it is possible to scan the message and all attachments for trigger words before displaying the pop-up and also provide a list indicating where and what trigger words can be found in the message and/or attachments.

The alert has been described as a pop-up message; the alert can also include a sound alert as well as other alerting techniques such as a blinking red box surrounding the pop-up message.

The embodiments have been described with respect to the scan operation being performed by the client computer 101; however, the scanning can be performed by the server or another machine. The embodiments have been described as using a client computer (such as a desktop, laptop, tablet, etc.) to create the email, attach the attachments, send, etc.; however, it is possible for other types of devices to create and send the email, for example, a handheld digital assistant, a smart telephone, a smart cellular telephone, etc.

The embodiments have been discussed with respect to performing the word search for sensitive words being initiated by the SEND button being pressed. However, the checking can occur based on other events. For example, the checking can be initiated when an address is added to the address filed of a message. As another example, the checking can run in the background much like a spell checker and alert the user whenever a sensitive word is added to the message, that is, the checking can be initiated or started by the creation of an email message or the start of the text. In this situation, it is also possible to set a flag for the production of an alert during the creation of the message when it is being drafted and then pop-up the alert when an address is added to the message address field. The checking can also occur, particularly for an attachment, when or each time an attachment is attached to a message.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on a computer-readable media, e.g., a non-transitory or persistent computer-readable medium. The program/software implementing the embodiments may also be transmitted over a transmission communication path, e.g., a network implemented via hardware. Examples of the non-transitory or persistent computer-readable media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media via which the program/software may be sent includes, for example, a carrier-wave signal.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
   allowing a user to specify trigger words;
   allowing the user to prepare an email message including adding a trigger word to indicate confidential previously presented nature of information being sent through a message or an attachment;
   detecting initiation of sending of the email message by detecting activation of a send function;
   scanning, by an email server, the email message including at least one of a message body and an attachment of the email message to determine whether the email message includes one or more of the trigger words which are indicated in a trigger word table, the trigger word table indicating that a message may be sensitive where the message comprises a message body and a message attachment and being created by the user previous to the email message preparation;
   alerting the user with a sound and a pop-up display message when the scanning determines that the email message includes one or more of the trigger words, the pop-up display message includes: a border surrounding that blinks, a message that the user is about to send the one or more of the trigger words determined as comprising confidential, proprietary or sensitive material in the trigger word table and, an email address of a recipient of the email message and corresponding locations of the one or more of the trigger words in the email message;
   wherein the pop-up display message further contains execution icons which allow the user to approve sending of the email message or to disapprove sending of the email message,
   wherein the trigger words are selected to stop sending of the email message determined as comprising confidential, proprietary or sensitive material, wherein the user is alerted directly when one or more of the trigger words are first found, wherein the alerting is triggered by an exact match with one or more of the trigger words, wherein the corresponding locations of the one or more of the trigger words determined to be included in the at least one of the message body and the attachment of the email message respectively identify the one or more of the trigger words as being located in one or more of a subject line, the message body and the attachment.

2. The method as recited in claim 1, wherein the trigger word table is created for the user by the user's agency.

3. The method as recited in claim 1, wherein the scanning is performed by the user's agency mail server and the user's agency produces an alert for the user's agency.

4. The method as recited in claim 1, wherein the trigger word comprises a word not appropriate in a business context.

5. The method as recited in claim 1, wherein the alerting occurs when an address is added to an address field of the email message.

6. The method as recited in claim 1, wherein the alerting occurs based on addition of a sensitive word to the email message.

7. The method as recited in claim 1, wherein the alerting occurs when the attachment containing a sensitive word is attached to the email message.

8. The method as recited in claim 1, wherein the scanning determines a type of the attachment and the attachment is converted into a text file for text scanning.

\* \* \* \* \*